US012600551B2

(12) United States Patent
Campbell

(10) Patent No.: US 12,600,551 B2
(45) Date of Patent: Apr. 14, 2026

(54) INFORMATION HANDLING SYSTEM THIN WALL PACKAGING

(71) Applicant: Dell Products L.P., Round Rock, TX (US)

(72) Inventor: Oliver F. Campbell, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 355 days.

(21) Appl. No.: 16/517,319

(22) Filed: Jul. 19, 2019

(65) Prior Publication Data

US 2021/0016948 A1 Jan. 21, 2021

(51) Int. Cl.
| | |
|---|---|
| *B65D 81/05* | (2006.01) |
| *B31D 5/00* | (2017.01) |
| *G06Q 10/08* | (2023.01) |

(52) U.S. Cl.
CPC ......... *B65D 81/051* (2013.01); *B31D 5/0078* (2013.01); *B65D 81/053* (2013.01); *G06Q 10/08* (2013.01); *B32B 2323/043* (2013.01); *B32B 2367/00* (2013.01)

(58) Field of Classification Search
CPC ........... B32B 1/02; B32B 27/32; B32B 27/36; Y10T 428/1352; Y10T 428/31855; Y10T 428/31678; F16F 7/087; B65D 81/051; B65D 81/053; B31D 5/0073; B65B 55/20
USPC ........................................ 428/35.7, 480, 500
See application file for complete search history.

(56) References Cited

U.S. PATENT DOCUMENTS

| | | | | | |
|---|---|---|---|---|---|
| 3,335,932 | A | * | 8/1967 | Brown ................. | B65D 81/057 |
| | | | | | 206/453 |
| 4,925,149 | A | * | 5/1990 | DiFrancesca ........ | H01H 9/0242 |
| | | | | | 206/320 |
| 5,040,684 | A | * | 8/1991 | Knowles .............. | B65D 81/055 |
| | | | | | 206/326 |
| 5,060,801 | A | * | 10/1991 | Vilas-Boas .......... | B65D 81/107 |
| | | | | | 206/509 |
| 5,298,214 | A | * | 3/1994 | Morrow ................ | B29C 48/022 |
| | | | | | 425/DIG. 46 |
| 5,299,685 | A | * | 4/1994 | Chin ...................... | B65D 81/02 |
| | | | | | 206/320 |

(Continued)

FOREIGN PATENT DOCUMENTS

| | | | | |
|---|---|---|---|---|
| CA | 2141257 | A1 | * | 7/1995 |
| CN | 202358514 | U | * | 8/2012 |

(Continued)

OTHER PUBLICATIONS

The Free Dictionary (tube), 2003-2024.*
The Free Dictionary (vary), 2003-2024.*
The Free Dictionary (interior), 2003-2024.*

*Primary Examiner* — Aaron Austin
(74) *Attorney, Agent, or Firm* — Zagorin Cave LLP; Robert W. Holland

(57) ABSTRACT

Information handling system packaging is formed from extruded polyethylene cut to length, such as polyethylene terephthalate (PET) or high density polyethylene (HDPE), to define an interior coupling region that fits over the information handling system housing and an outer support region that forms an ellipse compressed by a container that accepts the information handling system housing. An opening seam formed along the entire length of the outer support region provides for deflection of the packaging to absorb acceleration forces generated by the information handling system.

17 Claims, 4 Drawing Sheets

(56) References Cited

U.S. PATENT DOCUMENTS

| | | | | | |
|---|---|---|---|---|---|
| 5,392,920 | A | * | 2/1995 | Prete | B65D 85/307 |
| | | | | | 206/320 |
| 5,445,274 | A | * | 8/1995 | Pharo | B65D 81/052 |
| | | | | | 383/3 |
| 6,398,029 | B1 | * | 6/2002 | Farison | B65D 81/052 |
| | | | | | 206/592 |
| 6,685,021 | B2 | * | 2/2004 | Dodson | B65D 61/00 |
| | | | | | 206/391 |
| 8,407,970 | B2 | * | 4/2013 | Rometty | B65D 61/00 |
| | | | | | 53/263 |
| 9,045,271 | B2 | | 6/2015 | Matheison et al. | |
| 9,084,461 | B2 | * | 7/2015 | Jensen | A45C 11/00 |
| 2006/0259671 | A1 | * | 11/2006 | Swartzentruber ... | G06F 13/4022 |
| | | | | | 710/104 |
| 2008/0105592 | A1 | * | 5/2008 | Cheng | B65D 81/058 |
| | | | | | 206/591 |
| 2008/0128317 | A1 | * | 6/2008 | Tsukada | B65D 81/107 |
| | | | | | 206/594 |

| | | | | | |
|---|---|---|---|---|---|
| 2009/0071861 | A1 | * | 3/2009 | Wang | B65D 81/113 |
| | | | | | 206/523 |
| 2010/0276331 | A1 | * | 11/2010 | Fan | B65D 5/5069 |
| | | | | | 206/591 |
| 2019/0144190 | A1 | | 5/2019 | Zhang et al. | |
| 2019/0225403 | A1 | | 7/2019 | Nevo et al. | |
| 2020/0262640 | A1 | * | 8/2020 | Bao | B65D 85/48 |

FOREIGN PATENT DOCUMENTS

| | | | | | | |
|---|---|---|---|---|---|---|
| CN | | 102910379 | A | * | 2/2013 | B65D 81/107 |
| CN | | 203392186 | U | * | 1/2014 | |
| CN | | 103619730 | A | * | 3/2014 | B65D 85/62 |
| CN | | 204822590 | U | * | 12/2015 | |
| DE | | 2163850 | A1 | * | 6/1973 | |
| EP | | 4219337 | A1 | * | 8/2023 | B65D 81/107 |
| JP | | H0912063 | A | * | 1/1997 | |
| TW | | 1260300 | B | * | 8/2006 | |
| WO | WO-2007148183 | | A1 | * | 12/2007 | B65G 47/766 |
| WO | WO 2018236687 | | A1 | | 12/2018 | |

* cited by examiner

INFORMATION HANDLING SYSTEM THIN WALL PACKAGING

BACKGROUND OF THE INVENTION

Field of the Invention

The present invention relates in general to the field of portable information handling shipments, and more particularly to an information handling system thin wall packaging.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically manufactured at a centralized location, such as a factory, and then shipped to destinations worldwide. Client information handling systems, in particular portable information handling systems, are typically individually packaged at the manufacture location so that the individual systems may be shipped direct to end users. Often, shipment is performed by air so that packaging weight has a significant impact on shipment costs. Generally, information handling system manufacturers seek to minimize the weight of packaging and the cost of the packaging material while also attempting to use environmentally friendly materials that are readily recyclable. In any event, packaging generally must include sufficient protection for the information handling system to avoid damage during shipment, such as due to dropping, crushing or otherwise stressing the packaging material.

One common packaging material is molded fiber packaging made from fiber materials such as bamboo, wheat straw and paper pulp. Molded fiber cushioning tends to have low material cost but long manufacture times related to the drying process used. Molded fiber cushioning material is not elastic but rather tends to cushion by progressive failure of the structure. Thus, in a situation that involves repeated stress on the packaging, molded fiber cushioning material loses effectiveness over time. Molded fiber packaging offers good sustainability through recycling.

Another common packaging material is expanded polyethylene foam (EPE) cushions, which are manufactured by a lamination welding process to assemble multiple pieces of cut foam into one piece. The cutting and lamination process tends to have a moderate cost related to handling and positioning multiple cut pieces to form an appropriately shaped support. Actual production time is relatively short, about a minute, and adaptable to different sized information handling systems. EPE cushions have nonlinear performance so that protection tends to degrade over time. EPE cushions are, essentially, not recyclable.

Folded paper cushions, also known as origami cushions, involve the folding of cardboard, typically by hand, to define a cushion that operates by failure of the cardboard. Similar to molded fiber cushions, folded paper cushions tend to lose effectiveness over repeated stresses but provide a high degree of recyclability with a minimal cost.

These packaging options and other similar options have a number of limitations. For instance, these conventional packaging options use discreet manufacturing production processes on each single piece so that the production process is slow. Generally, to ensure sufficient packaging is available to meet shipping needs, the information handling system manufacture location has to maintain some inventory of packaging material. This creates logistical and storage costs that increase the complexity of the manufacture and shipping processes. The complexity is increased in that each size and model of information handling system tends to have its own specific packaging material. Well-fitted packaging provides the best protection where destruction of the packaging material generates the cushioning effect.

SUMMARY OF THE INVENTION

Therefore, a need has arisen for a system and method which provides information handling system thin wall packaging.

In accordance with the present invention, a system and method are provided which substantially reduce the disadvantages and problems associated with previous methods and systems for packaging of information handling systems. A length of extruded polyethylene material forms an inner coupling region that couples to an information handling system housing and an outer support region compresses against a container to absorb forces related to accelerations of the information handling system.

More specifically, an information handling system is assembled at a manufacture location to include a processor and memory in a housing. The information handling system is packaged in a container with a cushion coupled to the housing and compressed by the container to protect the information handling system against damage from forces generated by accelerations during transport of the container. The cushion is formed from extruded polyethylene, such as polyethylene terephthalate (PET) or high density polyethylene (HDPE), to define an inner surface that fits on the information handling system housing and an exterior surface that works against the container surface to absorb acceleration forces through deflection of the cushion about an opening seam that runs along the length of the exterior surface. Other types of extrusion materials may include polypropylene, nylon, and polyvinylchloride. The extruded material forms a multi-axial thin wall resilient structure that absorbs acceleration forces without deterioration of cushioning characteristics. In one embodiment, an extrusion device co-locates at an information handling system assembly manufacture location to provide packaging in real time as information handling systems are manufactured and/or shipped. In one example embodiment, extruded cushions are cut to length to adapt to different size information handling system housings. In another example embodiment, secondary in-line cutting of the cushion creates a hinge to support folding of the cushion for fitting about the corners of the information handling system housing.

The present invention provides a number of important technical advantages. One example of an important technical advantage is that information handling system packaging is produced real time with a continuous manufacturing process that readily adapts to different sizes and models of information handling systems. Specifically, a high speed extrusion process that cuts and folds cushions to match information handling system housing dimensions reduces manufacture time substantially relative to that of conventional packaging materials so that packaging materials may be produced in real time with minimal inventory requirements. In addition, the packaging provides a highly elastic and repeatable response with the curved shape of the extruded material creating a spring structure. The nature of the spring response is predictable by analytic means to tune the packaging design for each information handling system's size, weight and fragility. For instance, optimized combinations of packaging radii, moment arms, material thickness and material type create packaging on a system-by-system basis to ensure adequate system protection with minimal packaging materials. Further, sustainability of the packaging material is high since available materials for the extrusion process are widely recycled, such as polyethylene terephthalate (PET), high density polyethylene (HDPE), polypropylene, nylon and polyvinylchloride (PVC).

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system cushion is formed by extrusion of a polyethylene or similar material to have an inner surface that couples to the information handling system housing and an outer surface that compresses against a container wall and absorbs forces with deflection along an opening seam formed at the length of the cushion. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
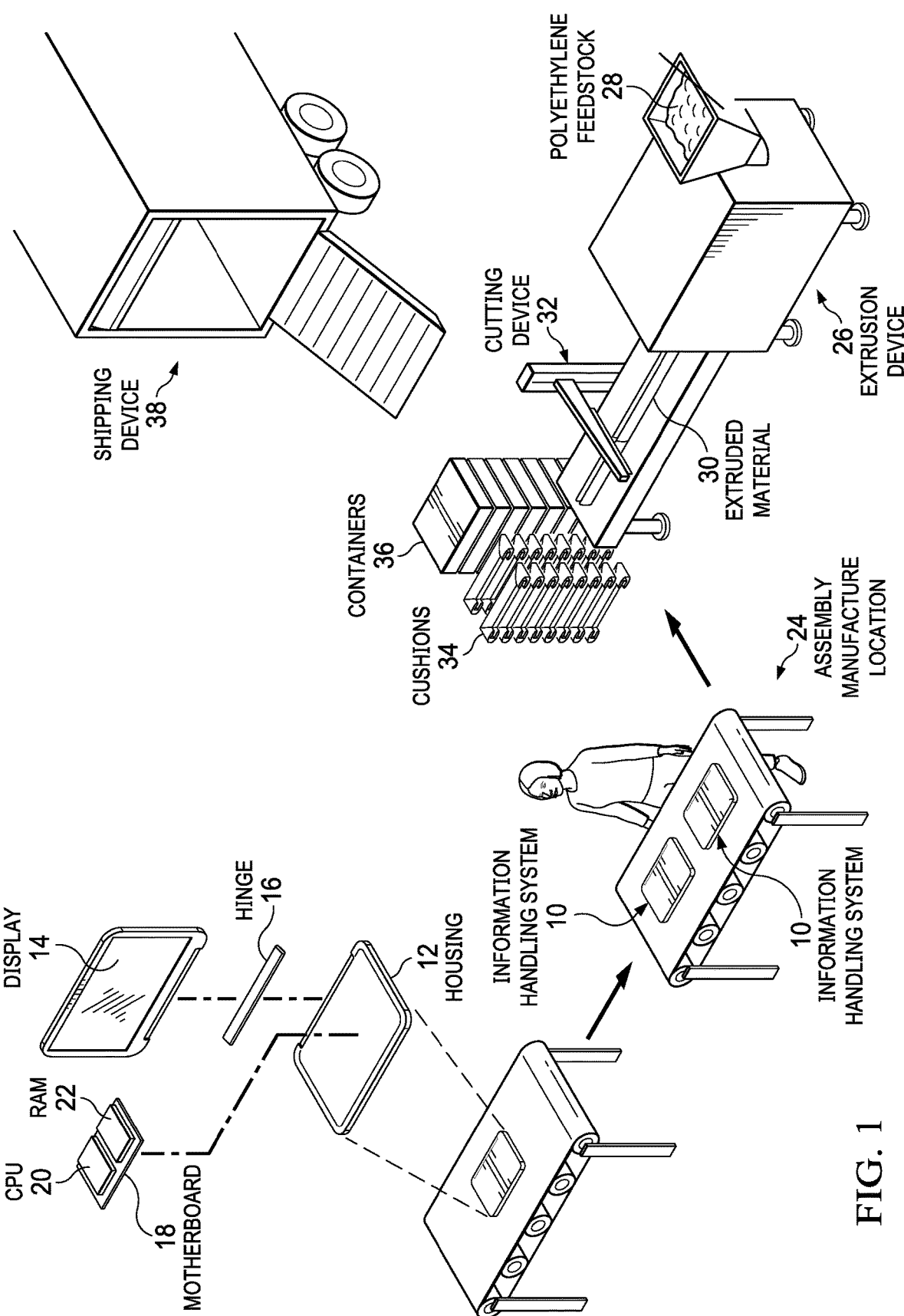
FIG. 1 depicts an example of information handling system manufacture and shipping at an assembly manufacture location.

Referring now to FIG. 1, an example depicts information handling system 10 manufacture and shipping at an assembly manufacture location 24. Generally, assembly manufacture location 24 is a logistical hub at which the many components used to assemble a complete information handling system 10 are made available for an assembly line. In the example embodiment, information handling system 10 is assembled into a portable housing 12 having a display 14 in one portion that is rotationally coupled by a hinge 16 to another portion. A motherboard 18 couples to the housing 12 to coordinate communication between processing components that cooperate to process information. For instance, a central processing unit (CPU) 20 executes instructions to process information in cooperation with random access memory (RAM) 22, which stores the instructions and information. Information handling systems 10 may include a variety of different types of processing components and a variety of alternative form factors, such as laptop, convertible, tablet, desktop and server information handling systems. With respect to the packaging for ensuring protection of an information handling system 10 during shipment, portable configurations tend to have greater susceptibility to damage from accelerations since the housings 12 are designed to have light weight to support mobile use patterns.

Once an information handling system 10 assembly is complete, the information handling system 10 is packaged for shipment to an end user. In the example embodiment, information handling systems 10 have a portable configuration and are individually package for shipment. An extrusion device 26 co-located at assembly manufacture location 24 produces extrusion material 30 that is cut into cushions for packaging information handling systems 10 in real time. Having extrusion device 26 co-located with the manufacture of information handling system 10 to generate cushions 34 in real time provides improved management of packaging inventory and reduced cost. Extrusion device 26 accepts a polyethylene feedstock 28, such as polyethylene terephthalate (PET) or high density polyethylene (HDPE), to output extrusion material 30 in a near instantaneous manner, as opposed to conventional fiber-based packaging, which can involve a twenty-four hour manufacture process. In alternative embodiments, extrusion device 26 may be placed at a separate manufacture location with an inventory of packaging material sent to the information handling system assembly manufacture location 24 as needed to support shipment of information handling systems 10. In alternative embodiments, different types of extrusion feedstock may be used, such as polypropylene, nylon and polyvinylchloride.

Extrusion device 26 in cooperation with cutting device 32 manufactures cushions 34 that provide a multi-axial, thin walled structure with an elastic spring effect having a spring and damping configurable by axis. As a result, a highly repeatable and linear shock absorption is provided across a wide range of housing sizes by adapting the shape and thickness of an extrusion material 30. In the example embodiment, extrusion device 26 passes polyethylene feedstock 28 through a shaped mold that sets extrusion material 30 in a desired shape with a desired material thickness to achieve a desired cushioning effect. Extrusion material 30 is produced as a continuous material in a continuous extrusion process and cut to a desired size by a cutting device 32. For instance, cutting device 32 adjusts a length of extrusion material based upon the size of information handling system 10 that is manufactured. In some instances, multiple-cut processing performed on extrusion material 30 supports a folded cushion 34 manufacture that aids in protection of corners of information handling system 10 housing 12, as described in greater detail below. Once cushions 34 are manufactured, information handling system 10 is inserted in the cushion 34 and into a container 36 for loading to a shipping device 38, such as a truck or airplane. Cushions 34 cooperate with containers 36 to absorb forces generated by accelerations during shipment.

Figure 2:
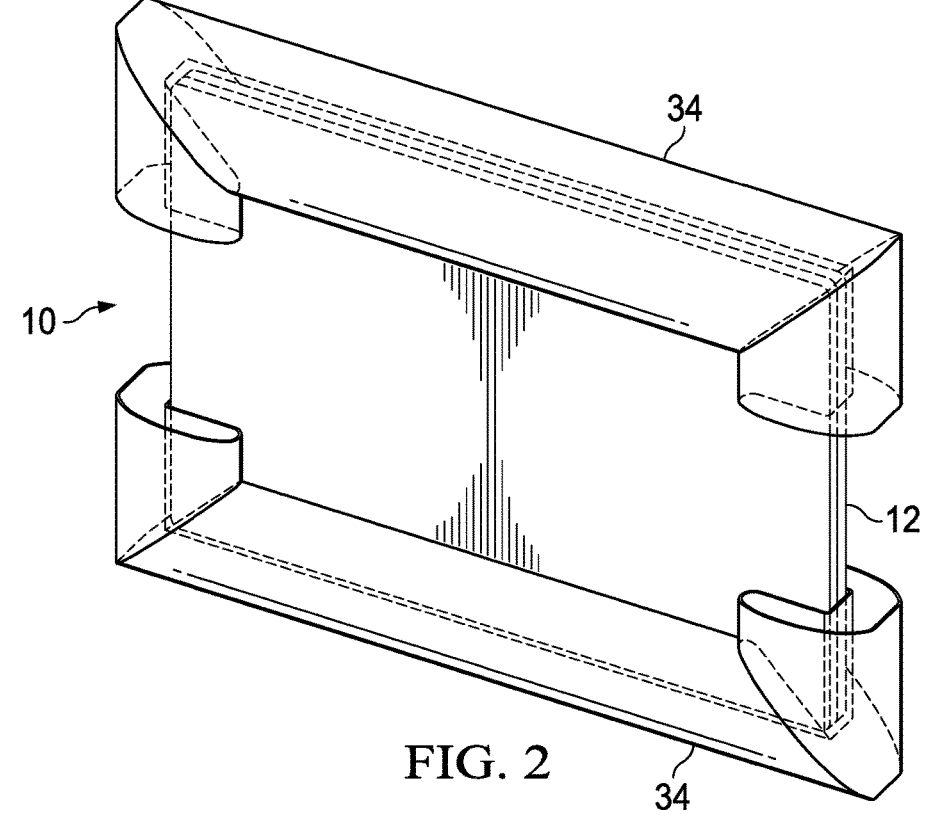
FIG. 2 depicts a perspective view of an information handling system protected by a set of multi-axial thin walled cushions and prepared for insertion into a container.

Referring now to FIG. 2, a perspective view depicts an information handling system 10 protected by a set of multi-axial thin walled cushions 34 and prepared for insertion into a container. Each cushion 34 has a pair of opposing cornered edges that fit over opposing corners of housing 12. Once cushions 34 are coupled to housing 12, information handling system 10 is inserted into a container, such as cardboard box. Cushions 34 extend outward past the upper and lower surfaces of housing 12 to hold information handling system 10 suspended within the shipping container. As a result, accelerations of information handling system 10 relative to the shipping container are absorbed through a spring and damper effect provided by the interaction of cushions 34 with the container.

Figure 3:
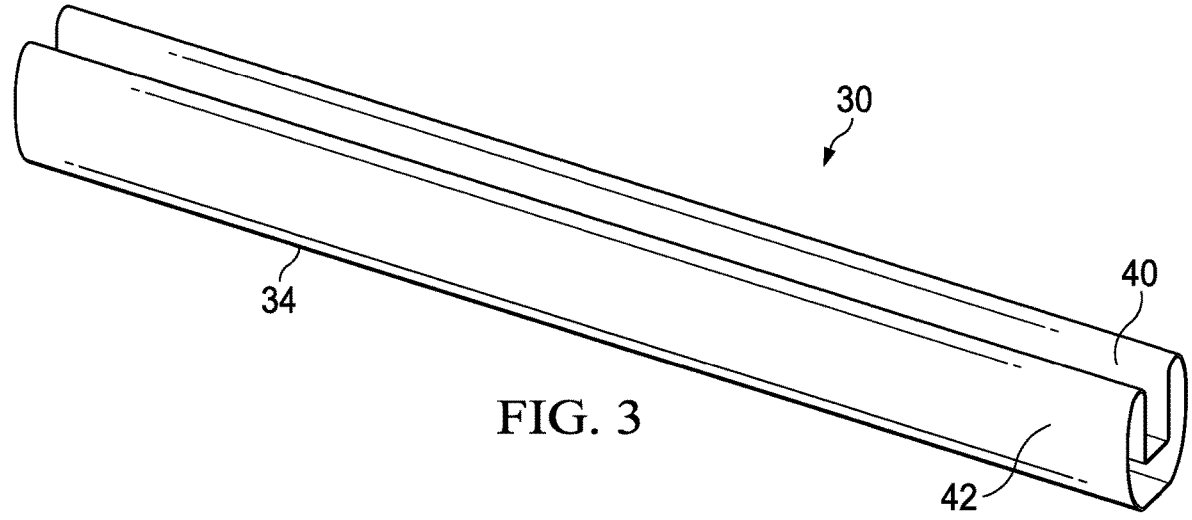
FIG. 3 depicts a side perspective view of a cushion configured to accept one side surface of an information handling system housing.

Referring now to FIG. 3, a side perspective view depicts cushion 34 configured to accept one side surface of an information handling system 10 housing 12. Cushion 34 is cut from a continuously extruded material 30 having a coupling region 40 formed with an interior shape that couples to an information handling system 10 housing 12 and a support region 42 formed with an exterior elliptical shape to press against a container that holds information handling system 10 housing 12. In the example depicted by FIG. 3, cushion 34 fits along one side edge of a housing 12 with coupling region 40 defining a cavity that conforms against housing 12 upper and lower surfaces to hold in place. The elliptical outer surface of support region 42 extends out and away from the position of housing 12 to hold housing 12 suspended distal a container wall that holds information handling system 10. A spring and damper effect is created by the material thickness of cushion 34, the shape of cushion 34 and the interaction that cushion 34 has with the interior walls of the container that holds information handling system 10. In the example embodiment, both opposing ends of extruded material 30 are cut cleanly through with an open passageway to the interior of cushion 34 between the open ends and external air so that the spring and damping effect is not impacted by air pressure within cushion 34, which maintains a consistent cushioning effect as air pressure changes, such as can happen during air transport. Alternative embodiments may adjust cushioning effects by restricting or sealing off airflow within cushion 34, such as by sealing or partially sealing the ends of cushion 34.

Figure 4:
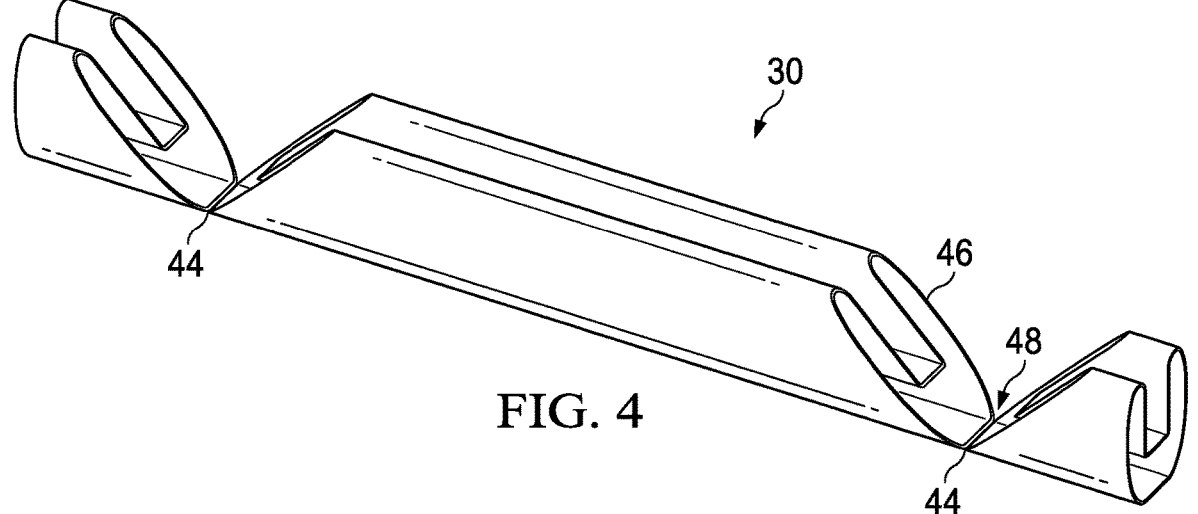
FIG. 4 depicts a side perspective view of a cushion configured with cuts made in extruded material to form a hinge at opposing ends of the cushion.

Referring now to FIG. 4, a side perspective view depicts cushion 34 configured with cuts 46 and 48 made in extruded material 30 to form a hinge 44 at opposing ends of cushion 34. In the example embodiment, each hinge 44 is formed by two forty-five degree cuts 46 that meet at a ninety degree cut angle 48 with the bottom portion of support region 42 remaining connected at ninety degree cut angle 48 to leave a hinge 44 of contiguous material. The example embodiment provides a convenient manner of forming a cushion 34 with corner protection and adjustable to a defined size of a housing 12. For instance, cushion 34 is manufactured by adjusting the length at which cutting device 32 cuts cushion 34 as extrusion material 30 passes out of extrusion device 26.

Figure 5:
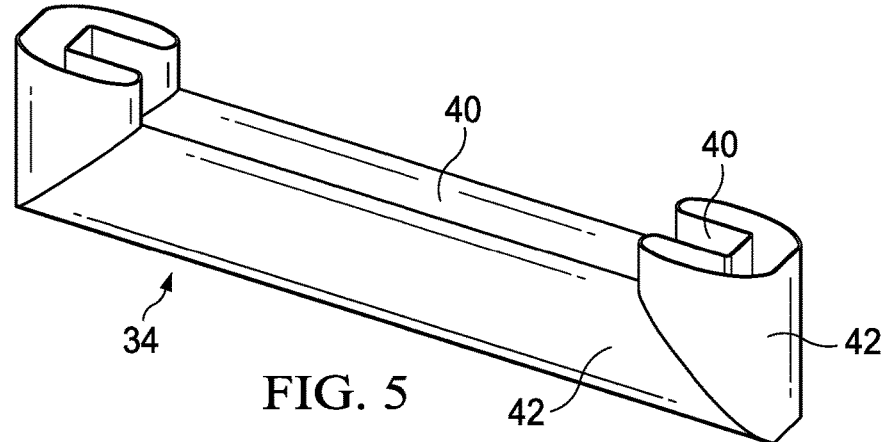
FIG. 5 depicts a side perspective view of a cushion configured to accept one side surface of an information handling system housing at opposing corners.

Referring now to FIG. 5, a side perspective view depicts cushion 34 configured to accept one side surface of an information handling system 10 housing 12 at opposing corners. Hinges 44 on opposing sides of cushion 34 have folded to form corner portion on opposing sides of cushion 34, such as that shown in FIG. 2 to capture opposing corners of housing 12. Coupling region 40 is sized to couple the entire length of one side of information handling system 10 housing 12 and a portion of a perpendicular side on opposing sides of the housing. Although the example embodiment depicted by FIGS. 4 and 5 illustrate a partial cut through extruded material 30, a full cut may be performed instead so that three separate pieces form the cushion disclosed by FIG. 5.

Figure 6:
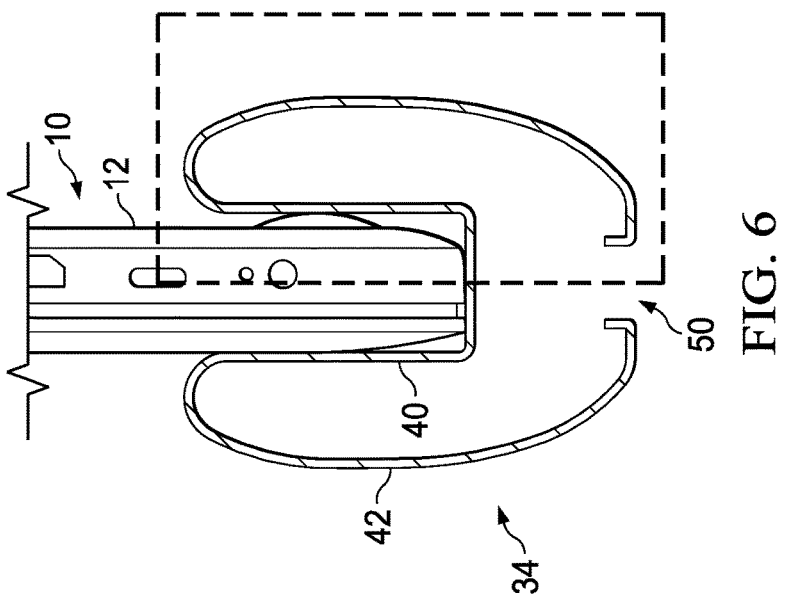
FIG. 6 depicts a side cutaway view of a cushion holding an information handling system within a coupling region.

Referring now to FIG. 6, a side cutaway view depicts a cushion 34 holding an information handling system 10 within a coupling region 40. In the example embodiment coupling region 40 has substantially parallel sides that extend up from a substantially perpendicular base. The substantially square corners of inner coupling portion 40 readily adapt to information handling systems that have slightly different side surfaces. For instance, having an interior coupling region that is slightly smaller than the height of information handling system 10 causes compression of coupling region 40 against information handling system 10 to hold cushion 34 in place. In alternative embodiments, coupling portion 40 may have a non-square shape that aids in the coupling of cushion 34 to information handling system 10, such as a ridge that extends inward or an indentation that aligns with feet of information handling system 10. In addition to the coupling offered by the size of coupling region 40 relative to the height of information handling system 10, compression may also result from cushion 34 pressing against the inner walls of a container 36.

One mechanism for cushion 34 to dissipate forces generated by acceleration of information handling system 10 is an opening seam 50 formed in the bottom of support region 42 and extending for the length of cushion 34. For example, opening seam 50 is part of the extrusion mold so that extrusion material 30 is created with opening seam 50 as a continuous opening. Opening seam 50 provides room for support region 42 to deflect as opening seam 50 grows and shrinks in size. The amount of spring and dampening effect generated by deflection at opening seam 50 may be estimated with a Finite Element Analysis model, such as by considering the size gap of opening seam 50, the radii of the elliptically-shaped support region 52, the material thickness provided by the extrusion mold, the material selection and any pre-loads generated by compression of coupling region 40 to information handling system 10 and interactions of support region 42 against a container in which cushion 34 is inserted. Cushion 34 is thus tunable for optimal levels of product protection on an axis-by-axis basis to ensure that sufficient protection is provided to the product for a defined fragility of the product, such as acceleration and/or force constraints. Further, container size, weight, material cost and sustainability may also be adapted to optimize product safety relative to shipping costs. For instance, increased thickness of extruded material 30 may provide an optimal solution for shipping by reducing container thickness requirements where container material adds more weight in an air freight scenario. In the example embodiment, the ends of slot 50 curl upwards to form a "ski tip" that helps to ensure that the slot 50 ends do not get caught on the container when the cushion 34 deflects. Further, the curled sides may provide a spring effect that helps to dissipate accelerations by absorption should the two curled ends compress into contact with each other.

Figure 7:
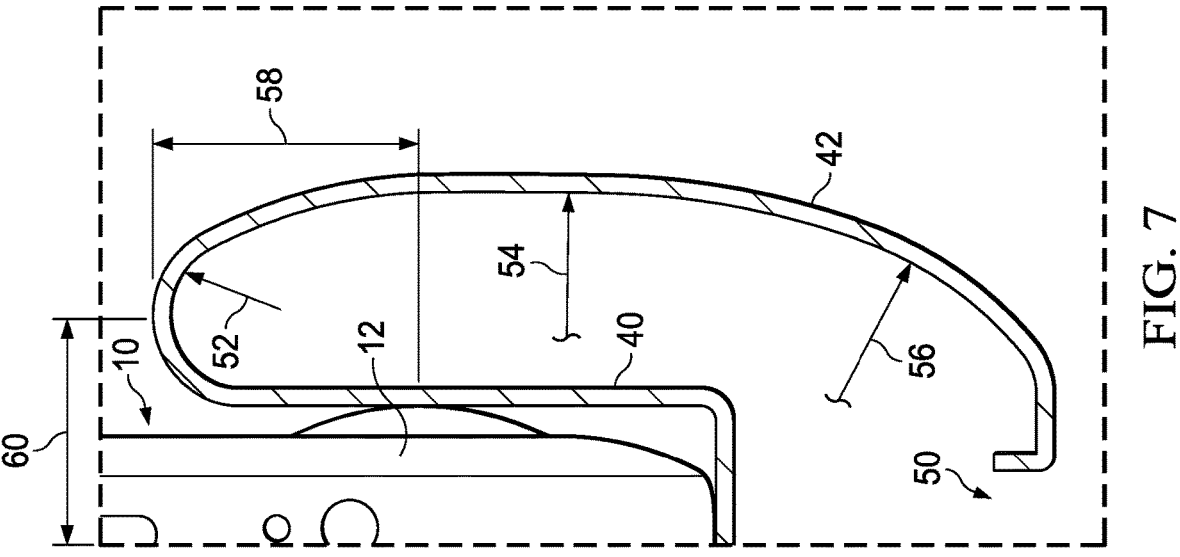
FIG. 7 depicts a side cutaway view of force resolution to dissipate acceleration forces at a portion of cushion.

Referring now to FIG. 7, a side cutaway view depicts force resolution to dissipate acceleration forces at a portion of cushion 34. In order to illustrate dissipation of forces related to accelerations at information handling system 10, three radii are depicted along multiple axes that generation perpendicular moment arms to dissipate acceleration-related forces with deflection along opening seam 50. Radii 52, 54 and 56 define rotational movement generated by acceleration forces and working to rotate support region 42 to allow movement at opening seam 50 relative to each radii. Moment arms 58 and 60 define a force reaction for accelerations that pass parallel versus perpendicular to housing 12. Near opening seam 50, a point contact on the container 36 wall enables sliding of support region 42 relative to the container 36 wall. The cushion 34 radii 52, 54 and 56 and moment arms 58 and 60 may be adjusted by changing the elliptical shape of support region 42, the thickness of the extruded material 30 and the load places upon cushion 34 by container 36 compression, which further adjusts based upon container material selection and thickness. The result is specific multi-axial performance for a spring response and dampening of acceleration based forces about all of the X, Y and Z axes of information handling system 10.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having an upper surface, a lower surface and a side surface disposed between the upper and lower surface;
   a processor disposed in the housing and operable to process information;
   a memory disposed in the housing and operable to store the information;
   a container having an interior sized to accept the housing for shipping; and
   a packaging cushion disposed between the housing and the container, the packaging cushion formed from a length of material of plastic that defines a coupling region sized to fit around a portion of the housing upper surface, lower surface and side surface and a support region sized to press against the container interior, the packaging cushion having an unsealed interior with the support region having an opening seam formed opposite the coupling region along the entire length of the material to provide a passage between the unsealed interior and an exterior of the packaging cushion, the opening seam having a gap of varying size when the material deflects in response to accelerations of the housing against the coupling region, the gap smaller than a width of the interior at the gap.

2. The information handling system of claim 1 wherein the housing further comprises:
   a lid portion having an integrated display;
   a main portion having an integrated keyboard; and
   a hinge rotationally coupling the lid portion and main portion.

3. The information handling system of claim 1 wherein the packaging cushion comprises extruded polyethylene terephthalate (PET).

4. The information handling system of claim 1 wherein the packaging cushion comprises high density polyethylene (HDPE).

5. The information handling system of claim 1 wherein the coupling region comprises a base aligned parallel with the portion of the housing side surface and opposing sides extending substantially perpendicular to the base and aligned parallel with the upper and lower housing surfaces, the coupling region extending along the entire length of the material.

6. The information handling system of claim 5 wherein support region comprises an elliptical shape.

7. The information handling system of claim 6 wherein the support region deflects to absorb accelerations of the housing across multiple directions.

8. The information handling system of claim 1 wherein:
   the packaging cushion material has first and second cut portions to define a crease; and
   the packaging cushion material folds at the first and second cut portions to form a right angle at each of opposing ends of the housing to engage orthogonal sides of the housing with the coupling region.

9. The information handling system of claim 1 wherein the packaging cushion has an opening at each of opposing ends of the length.

10. An information handling system comprising:
    a housing having an upper surface, a lower surface and a side surface disposed between the upper and lower surface;
    a processor disposed in the housing and operable to process information;
    a memory disposed in the housing and operable to store the information;
    a container having an interior sized to accept the housing for shipping; and
    a length of extruded polyethylene material having a coupling region sized to fit partially around the housing upper surface and lower surface to capture the side surface and having an outer support region extending away from the housing and sized to press against the container, the outer support region having an opening seam opposite the coupling region along the entire length so that the extruded polyethylene material has an interior side that is unsealed to an exterior side, the opening having a gap that compresses and spreads apart in response to accelerations at the housing, the gap smaller than a width of the interior.

11. The information handling system of claim 10 wherein the extruded polyethylene material comprises extruded polyethylene terephthalate (PET).

12. The information handling system of claim 10 wherein the extruded polyethylene material comprises extruded high density polyethylene (HDPE).

13. The information handling system of claim 10 wherein the outer support region comprises an elliptical shape.

14. The information handling system of claim 10 wherein the extruded polyethylene material has an opening at each of opposing ends of the length.

15. An information handling system comprising:

a housing;

a processor disposed in the housing and operable to process information;

a memory disposed in the housing and operable to store the information; and a cushion formed as an unsealed extruded tube of plastic material having a coupling region sized to engage the housing and having an outer support region extending away from the housing and sized to press against a container, the outer support region having an opening seam formed at extrusion opposite the coupling region along the tube for an entire length of the tube, the opening seam providing an air passage from an interior of the tube to an exterior of the tube, the opening seam having a gap that changes size in response to accelerations at the housing, the gap smaller than a width of the interior.

16. The information handling system of claim 15 wherein the coupling region comprises a base aligned parallel with the portion of the housing side surface and opposing sides extending substantially perpendicular to the base and aligned parallel with the upper and lower housing surfaces, the coupling region extending along the entire length of the material.

17. The information handling system of claim 15 wherein:

the cushion comprises a material having first and second cut portions to define a crease; and the cushion material folds at the first and second cut portions to form a right angle at each of opposing ends of the housing to engage orthogonal sides of the housing with the coupling region.

\* \* \* \* \*